United States Patent
Jaggers

Patent Number: 5,190,300
Date of Patent: Mar. 2, 1993

[54] TOP JAW AND WEDGE CONNECTOR

[75] Inventor: James R. Jaggers, Fort Lauderdale, Fla.

[73] Assignee: DL&J, Inc., Fort Lauderdale, Fla.

[21] Appl. No.: 863,862

[22] Filed: Apr. 6, 1992

Related U.S. Application Data

[63] Continuation-in-part of Ser. No. 774,826, Oct. 11, 1991, which is a continuation-in-part of Ser. No. 681,714, Apr. 8, 1991, Pat. No. 5,076,596.

[51] Int. Cl.$^5$ .............................................. B23B 31/10
[52] U.S. Cl. ..................................... 279/124; 279/153
[58] Field of Search ............... 279/110, 123, 124, 152, 279/153

[56] References Cited

U.S. PATENT DOCUMENTS

| | | | |
|---|---|---|---|
| 4,029,325 | 6/1977 | Röhm | 279/123 |
| 4,667,972 | 5/1987 | Hiestand | 279/153 X |
| 5,076,596 | 12/1991 | Jaggers | 279/123 |

Primary Examiner—Steven C. Bishop
Attorney, Agent, or Firm—Malin, Haley, McHale, DiMaggio & Crosby

[57] ABSTRACT

A top jaw system for securing a top jaw in position above a chuck on a milling machine, lathe or the like is provided. The system generally includes a base jaw, top jaw, master jaw, and a conventional jaw nut. The base jaw includes a bottom portion and a portion and a wedge portion. The top jaw is removably attached to the wedge portion by a pin while the bottom portion is removably attached to the jaw nut by removable mounting bolts. The jaw nut is disposed within a channel of the master jaw. The top jaw can be quickly replaced by the removable of the pin.

9 Claims, 5 Drawing Sheets

TOP JAW AND WEDGE CONNECTOR

BACKGROUND OF THE INVENTION

This Application is a continuation-in-part of U.S. application Ser. No. 07/774,826, filed Oct. 11, 1991, which is a continuation-in-part of U.S. patent application Ser. No. 07/681,714, filed Apr. 8, 1991, now U.S. Pat. No. 5,076,596.

1. Field of the Invention

The instant invention relates generally to top jaws for use on chucks on lathes, milling machines and the like and more particularly to top jaws which can be easily and rapidly interchanged without removing the means by which the top jaw is attached to the chuck.

2. Description of the Related Art

In the art, chucks on milling machines, lathes or the like typically have channels cut into their outer surface. These channels extend radially outward from the center of the chuck. Master jaws are placed in the channels and attached to hydraulic means for moving the master jaws along the channels. These master jaws typically have inverted T-shaped channels extending along their lengths for receiving and securing jaw nuts which are in turn connected to the top jaws.

A jaw nut corresponding in shape to the inverted T-shaped channel of the master jaw is slid along the master jaw to a desired position on the chuck. A top jaw is typically placed on the top surface of the jaw nut above the plane of the outer surface of the chuck. Removable bolts extend downward through the top jaw into threaded recesses in the jaw nut. Upon tightening the bolts, the top jaw is drawn downward into contact with the top surface of the master jaw while the jaw nut is drawn upward into contact with channel in the master jaw. This process locks the top jaw in position on the master jaw.

In order to replace the prior art top jaws, these bolts are removed allowing the top jaw to be pulled away from contact with the upper surface of the jaw nut and master jaw. A new top jaw is positioned above the jaw nut and bolts are passed through the top jaw into contact with the threaded recesses in the jaw nut. The bolts are tightened drawing the top jaw into contact with the upper surface of the master jaw and the jaw nut into contact with the contours of the T-shaped channel.

Aligning and re-threading the bolts through the top jaw into the jaw nut requires considerable manipulation and precise alignment. For this reason, the changing of a top jaw is time consuming and is often very difficult. It is, therefore, to the effective resolution of the aforementioned problems and shortcomings that the present invention is directed.

SUMMARY OF THE INVENTION

A base or intermediate jaw comprising a bottom portion and a wedge portion is provided. The bottom portion includes a lower surface adapted to receive a conventional jaw nut and to be fitted upon a master jaw. A plurality of apertures extend downward through the bottom portion. Removable bolts extend downward and are inserted through the apertures into threaded recesses in the jaw nut to secure the base jaw to the master jaw. Upon tightening the bolts, the base jaw is drawn downward into contact with the top surface of the master jaw while the jaw nut is drawn upward into contact with the channel in the master jaw. This process locks the base jaw in position on the master jaw.

The base jaw also includes a wedge or top portion attached to the top surface of the bottom portion. The wedge portion includes an aperture defining a pair of flat angled contact faces and a bottom surface. The contact faces extend entirely across the surface of the wedge portion. The contact faces extend upward at one end from the bottom surface at acute angles relative to the bottom surface until they meet at their opposite ends.

A top jaw having a slot corresponding in size to the wedge portion of the base jaw is provided. The top jaw is placed on the base jaw so that the wedge portion extends upward into the slot of the top jaw and the bottom surface of the top jaw is resting on the top surface of the bottom portion of the base jaw. The top jaw has a pin aperture extending through the slot parallel to the angled contact faces of the wedge portion. A pin having a plurality of flat angled surfaces along its longitudinal length is placed through the pin aperture in the top jaw. When the pin is placed in position within the pin aperture and the wedge portion pushed toward the pin, one of the angled surfaces of the pin contacts one of the angled contact faces of the wedge portion.

In replacing the top jaw, the pin is removed from the pin aperture. Then the top jaw may be lifted off the base jaw and away from the master jaw. Thereafter, a new top jaw having a slot and pin aperture is inserted over the wedge and onto the base jaw. The pin is replaced through the pin aperture exactly as before so that one of the flat angled surfaces of the pin comes into contact with one of the angled contact faces of the wedge portion. This contact between the wedge portion and pin holds the new top jaw in position above the master jaw as described above.

With the instant invention, the process of exchanging top jaws is speeded substantially. With the prior art top jaws about ten minutes was needed to change the top jaws. With the instant invention, considerably less time is needed to change top jaws. Further, because there is no need for precise alignment of bolts and recesses, the ease with which top jaws are exchanged is greatly improved.

In view of the foregoing, and in consideration of the following detailed description, it is an object of the instant invention to provide a top jaw system which allows one top jaw to be easily exchanged with another top jaw.

It is another object of the instant invention to provide a top jaw which may be rapidly exchanged with another top jaw.

It is a further object of the instant invention to provide a top jaw which may be easily aligned along the master jaw.

It is a further object of the instant invention to provide a top jaw which is inexpensive and easy to manufacture.

Other objects and advantages of this invention will become apparent from the following descriptions taken in conjunction with the accompanying drawings wherein set forth, by way of limitation and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
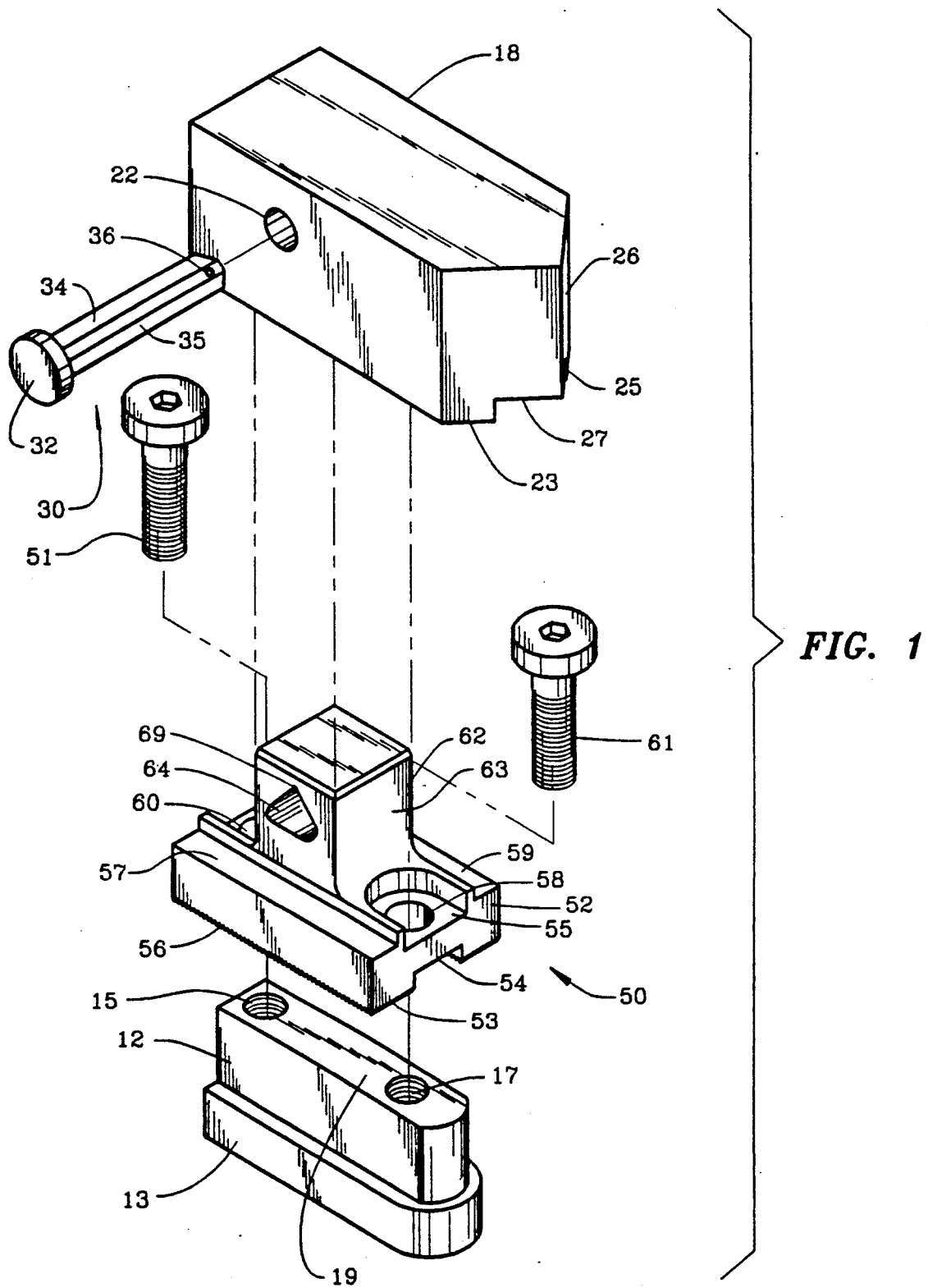
FIG. 1 is a perspective view of the instant invention.
Figure 2:
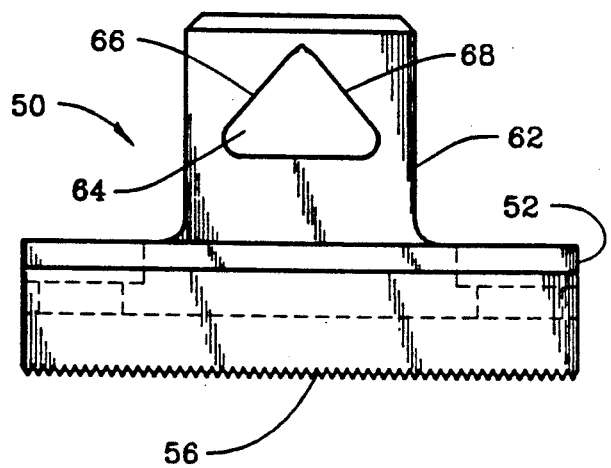
FIG. 2 is front view of the intermediate jaw of the invention of FIG. 1.
Figure 3:
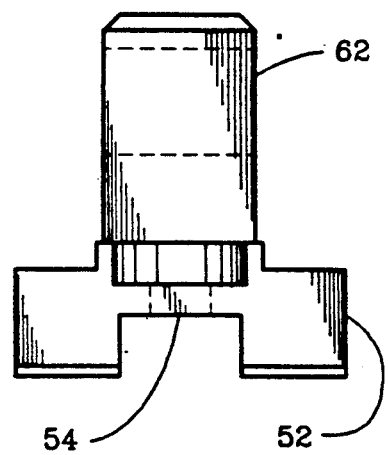
FIG. 3 is a side view of the intermediate jaw of the invention of FIG. 1.
Figure 4:
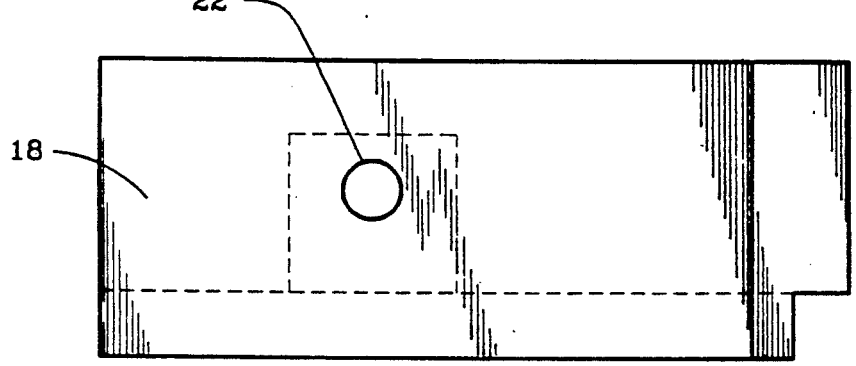
FIG. 4 is a front view of the top jaw secured to the intermediate jaw of the invention of FIG. 1.
Figure 5:
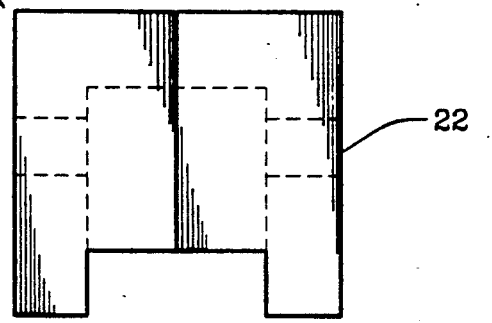
FIG. 5 is a side view of the top jaw secured to the intermediate jaw of the invention of FIG. 1.
Figure 6:
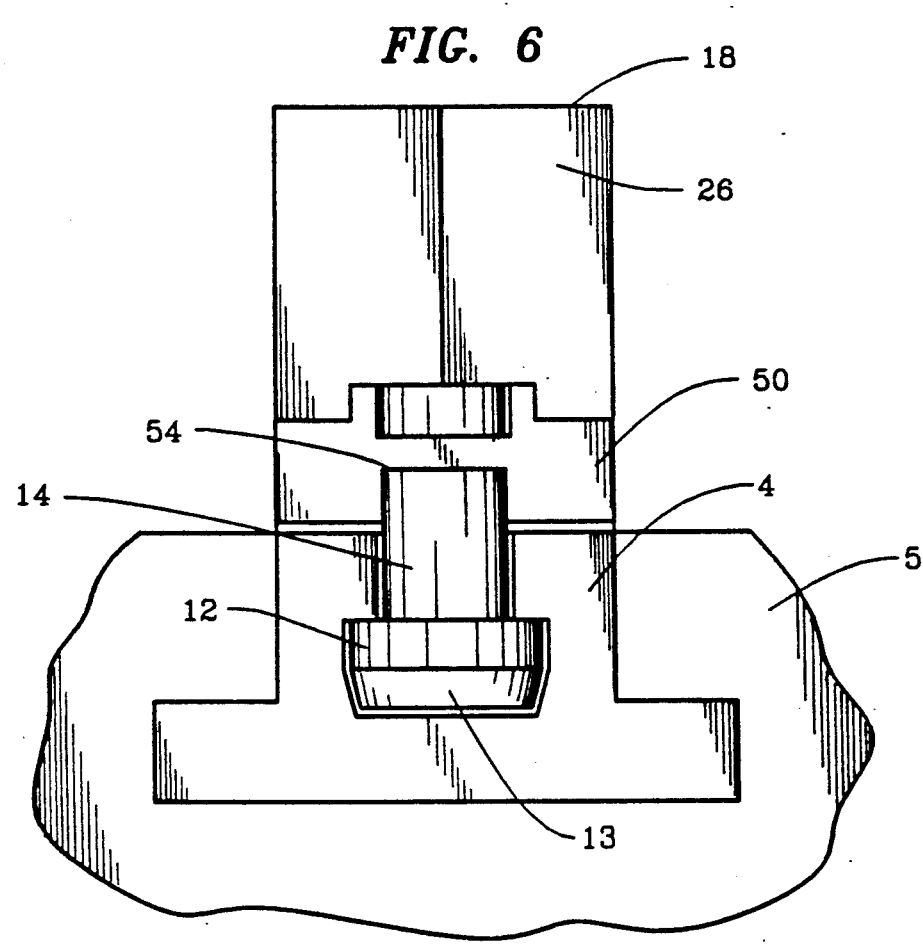
FIG. 6 is a rear elevational view of the invention of FIG. 1 in position on a master jaw attached to a chuck.
Figure 7:
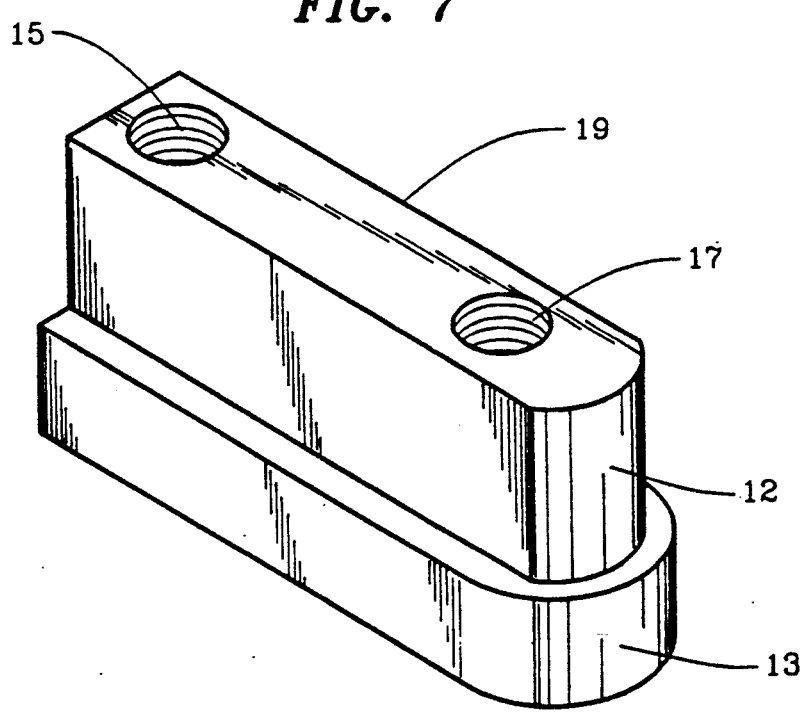
FIG. 7 is a perspective view of the jaw nut used in connection with the invention of FIG. 1.
Figure 8:
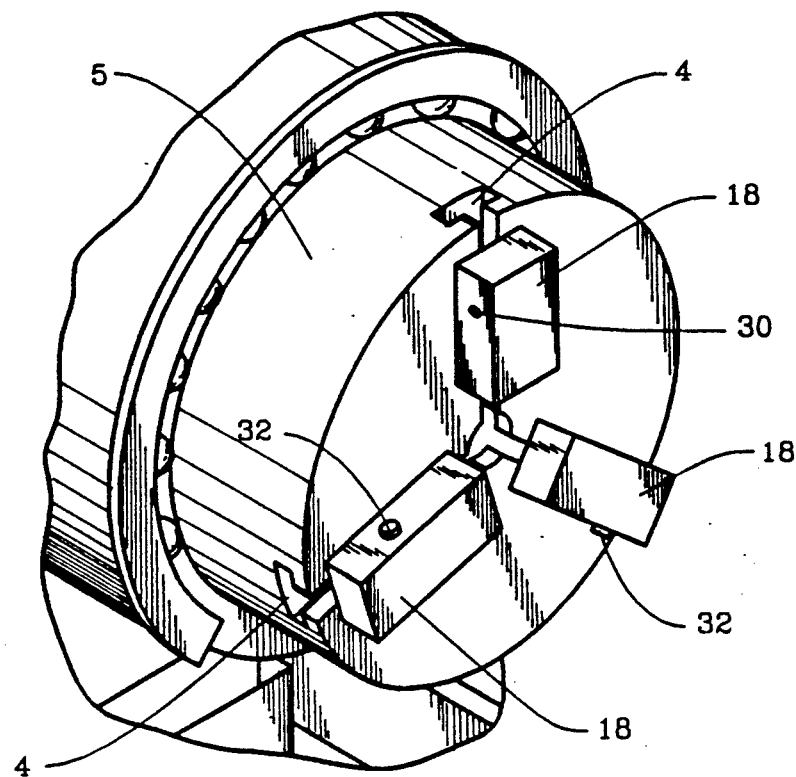
FIG. 8 is a perspective view of the top jaws in position on a chuck.
Figure 9:
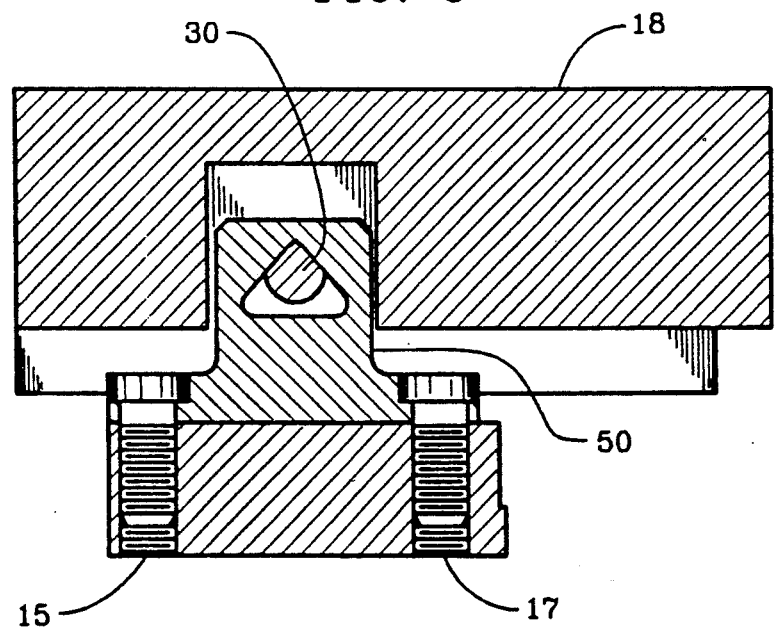
FIG. 9 is a cross-sectional view of a top jaw assembled with a base jaw.
Figure 10:
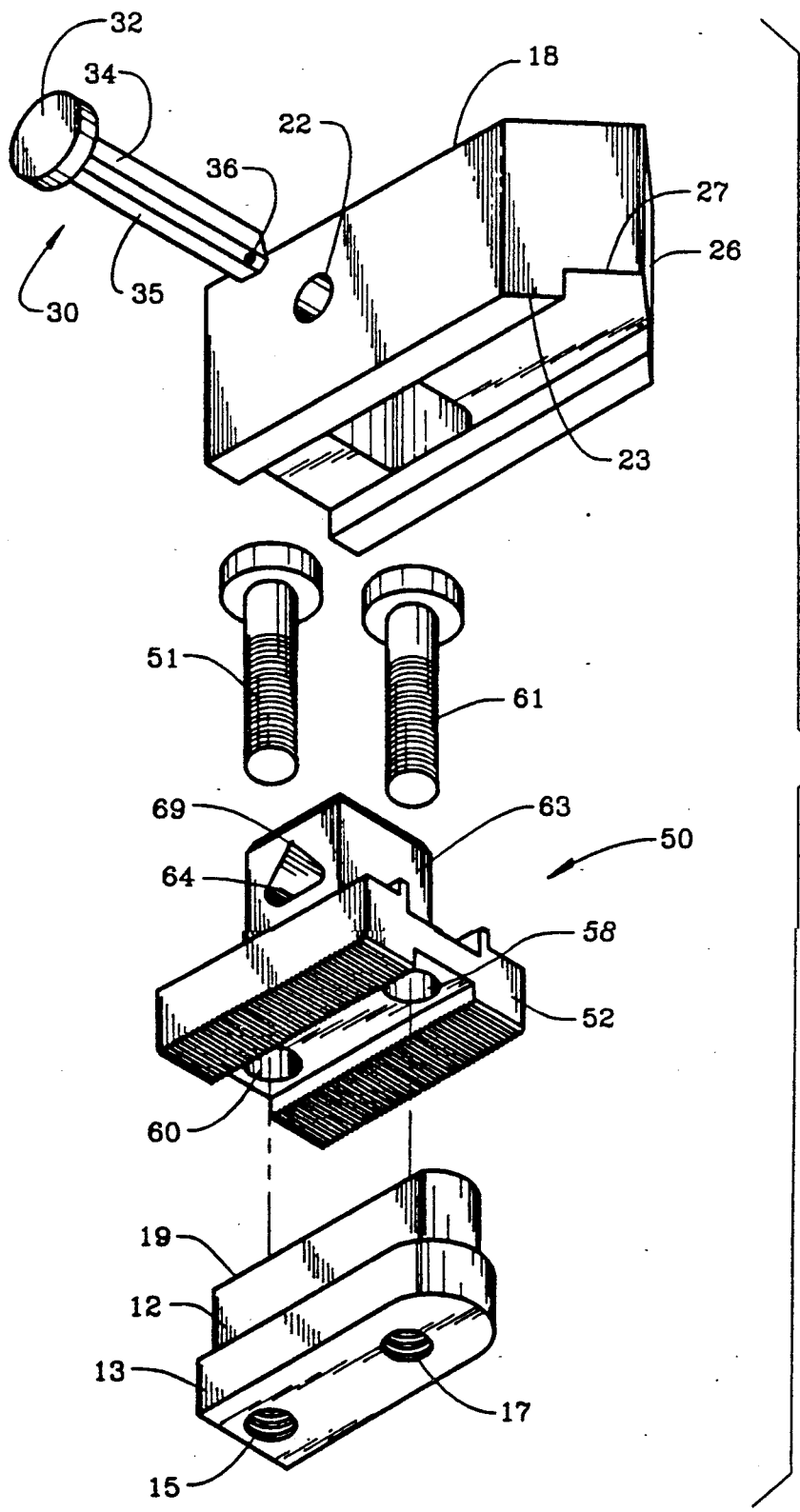
FIG. 10 is a perspective view similar to FIG. 1, but from a different angle.

Referring now to the drawings, the present invention is generally shown in FIGS. 1-8. A top jaw 18 is positioned on an intermediate or base jaw generally numbered as 50. Base jaw 50 is mounted to a conventional jaw nut 12 as will be more fully described below. Extending flanges 13 are integrally formed with jaw nut 12. Jaw nut 12 and extending flanges 13 are shaped as is common in the art to conform to the inverted "T"-shaped channel of a master jaw 4 on a chuck 5 (FIG. 6). Top jaw 18 is mounted to master jaw 4 through base jaw 50 and jaw nut 12. Top jaw 18 has at least one work piece end 26 configured to contact and hold a work piece when top jaw 18 is attached to master jaw 4. Master jaw 4 is recessed into a groove in chuck 5 of a lathe or similar device. The groove positions master jaw 4 on chuck 5 and prevents side to side movement of master jaw 4 on chuck 5.

Top jaw 18 is provided having an elongated slot 27 extending into top jaw 18 from the side of the top jaw 18 directed toward the chuck. The elongated axis of slot 27 is parallel to the axis of master jaw 4 when top jaw 18 is in position on master jaw 4 as will be described. A pin aperture 22 extends entirely through top jaw 18 passing through slot 27 at a right angle to the elongated axis of slot 27. A pin 30 is also provided as will be described in detail hereafter.

Base jaw 50 is provided with two mounting apertures 58 and 60. However, it is to be understood that the instant invention is not limited to two apertures. In use, after master jaw 4 has received jaw nut 12, base jaw 50 is received by jaw nut 12. Jaw nut 12 includes threaded recesses 15 and 17, which, after base jaw 50 has been accepted by jaw nut 12, will be aligned with mounting apertures 58 and 60. Removable mounting bolts 51 and 61 are received within apertures 58 and 60 and threaded recesses 15 and 17 in order to securely mount base jaw 50 to jaw nut 12 and master jaw 4. Mounting apertures 58 and 60 extend through bottom member from a top surface 55 to the jaw nut receiving channel 54. The diameter of mounting apertures 58 and 60 is smaller at the jaw nut receiving channel 54 than at top surface 55. Thus, the heads of removable mounting bolts 51 and 61 are restrained from passing out of apertures 58 and 60 by their interaction with the reduced diameter.

Base jaw 50 includes generally a rectangular bottom member 52 and a top member 62. Bottom member 52 contains a series of serrations 56 along its lower surface. These serrations 56 comprise essentially right-triangular protrusions arranged in parallel along the lower surface of bottom member 52 and extending across the downwardly extending legs 53 of bottom member 52. Serrations 56 correspond in size and shape to right-triangular serrations (not shown) on master jaw 4. The serrations of master jaw 4 extend into the corresponding triangular shaped spaces between serrations 56 of base jaw 50, thereby preventing base jaw 50 from moving forward or backward in a direction perpendicular to serrations 56.

When base jaw 50 is placed upon jaw nut 12, serrations 56 of base jaw 50 are brought into contact with the serrations of master jaw 4, thereby positioning base jaw 50 on master jaw 4 within the tolerance of the spacing between serrations 56. Removable mounting bolts 51 and 61 are inserted through mounting apertures 58 and 60 of base jaw 50 and threaded recesses 15 and 17 of jaw nut 12. Tightening removable mounting bolts 51 and 61 brings them into physical contact with the reduced diameters of mounting apertures 58 and 60 thereby securely fastening base jaw 50 to jaw nut 12. Also, upon tightening bolts 51 and 61, base jaw 50 is drawn downward into contact with the top surface of master jaw 4 while jaw nut 12 is drawn upward into contact with the channel in master jaw 4. This process locks base jaw 50 in position on master jaw 4.

Base jaw 50 further includes a wedge portion 62 integrally formed or machined with the bottom portion 52 of base jaw 50. Wedge 62 has a back 63 on one end and aperture 64 extending through wedge 62. Aperture 64 defines a pair of angled contact faces 66 and 68 and a bottom surface 67. Contact faces 66 and 68 are flat and extend entirely across the surface of wedge 62. Contact faces 66 and 68 extend upward at one end from bottom surface 67 of aperture 64 at acute angles relative to bottom surface 67 until they meet at 69 of FIG. 1.

Slot 27 is slightly larger in length and approximately the same width as wedge 62. In operation, top jaw 18 is placed over wedge 62 so that wedge 62 extends into slot 27.

Pin 30 has a pair of flat angled faces 34 and 35 extending entirely along the length of pin 30. Pin 30 also has a pin head 32 which is larger in cross sectional circumference than pin 30. When top jaw 18 is placed on base jaw 50 so that wedge 62 extends into slot 27 and top jaw 18 is resting upon top surfaces 57 and 59 of bottom member 52, pin 30 is placed through pin aperture 22 in top jaw 18 so that one of the angled faces 34 or 35 of pin 30 comes in contact with one of the flat contact faces 66 or 68 of wedge 62. Pin 30 is manually pushed through pin aperture 22 so that pin head 32 comes into contact with the outside surface of top jaw 18. Contact between pin head 32 and top jaw 18 prevents pin 30 from passing entirely through pin aperture 22.

Each master jaw 4 on the chuck is attached to hydraulic devices, as is common in the art, for moving master jaws 4 along the recesses in the chuck. The movement of master jaw 4 by its respective hydraulic device pushes wedge 62 toward pin 30. Because of the angled contact face 66 or 68 of wedge 62, wedge 62 tends to rise upward with respect to pin 30. This upward movement causes jaw nut 12 to also move upward. This upward movement of jaw nut 12 moves flanges 13 into contact with the corresponding channels of master jaw 4. This brings jaw nut 12 into solid and secure contact with master jaw 4.

The upward movement of wedge 62 puts downward pressure on pin 30 which is transferred to top jaw 18 through the contact of pin 30 with pin aperture 22. This downward pressure on top jaw 18 places legs 23 and 25 of top jaw 18 into contact with the top surfaces 57 and 59 of the base jaw 50. Therefore, the continued movement of master jaw 4 in the same direction causes top jaw 18 to move further downward into contact with top surfaces 57 and 59 of base jaw 50 while jaw nut 12 moves upward in the master jaw 4 so that the entire device is securely positioned above master jaw 4.

The angle of contact faces 66 and 68 relative to the bottom of aperture 64 is chosen so that the movement of master jaw 4 causes wedge 62 to produce both forward and downward pressure on pin 30. The forward pressure moves contact face 66 or 68 toward pin 30. The downward pressure pushes pin 30 toward the upper surface of master jaw 4. Downward pressure on pin 30 produces a corresponding upward pressure on wedge 62 which is transferred to jaw nut 12.

As the angle of the contact faces 66 and 68 relative to the bottom of aperture 64 approaches one hundred and twenty (120) degrees, the amount of downward pressure applied to top jaw 18 and corresponding upward pressure applied to jaw nut 12 is minimized. On the other hand, as the angle of contact faces 66 and 68 relative to the bottom of aperture 64 approaches zero, the master jaw must be moved in the same direction a relatively large distance to produce sufficient downward force on top jaw 18 and upward force on jaw nut 12 to securely clamp the device (jaw nut 12, base jaw 50 and top jaw 18) above master jaw 4. In practice, an angle for contact faces 66 and 68 of sixty (60) degrees relative to bottom surface 67 has been found particularly effective. However, it is recognized that considerable variation in this angle is permitted by the invention according to the individual needs to which the device is subjected. The important factor is that the movement of wedge 62, by the movement of master jaw 4, causes both downward and forward pressure to be applied on pin 30 through wedge 62. Thus, the interaction between wedge 62 and pin 30 pulls top jaw 18 securely down to lock in place and reduce jaw lift. Top jaw 18 is locked into place by the chuck gripping force without the need for any additional tools.

Each top jaw 18 has at least one work piece end 26 configured to contact and hold a work piece when master jaws 4 are moved along the recesses in the chuck. For most applications, the work piece will be located at the center of the chuck so that master jaws 4 will move toward the center of the chuck thereby pushing work piece end 26 of top jaw 18 into contact with the workpiece. However, for grasping the interior of pipes and the like, work piece end 26 may be directed away from the center of the chuck and master jaws 4 move outward of the chuck allowing the inside surface of the work piece pipe or similar item to be grasped.

No serrations are present on legs 23 and 25 of top jaw 18 and top surfaces 57 and 59 of bottom member 52 in order to enhance the slidability of top jaw 18 and, thus, increase the locking force. Additionally, base jaw 50 and pin 30 are hardened and titanium nitrate coated to add lubricity between base jaw 50 and top jaw 18 to further assure a smooth operation between base jaw 50 and top jaw 18.

Therefore, the movement of master jaw 4 will cause pin 30 to contact one of the contact faces 66 or 68 and securely position the device above master jaw 4, as described above. Accordingly, the movement of master jaw 4 outward will cause pin 30 to contact the other of the two contact faces 66 or 68, which will produce the same effect on the device as when moving master jaw 4 inward.

When it is desired to replace top jaw 18 with an alternative top jaw, the pressure on pin 30 is reduced accordingly to allow pin 30 to be removed from pin aperture 22 in top jaw 18. With pin 30 removed, top jaw 18 may be lifted off of wedge 62. Thereafter, a new top jaw having a slot as described above may be placed over wedge 62. The original or a new pin is placed through the pin aperture in the new top jaw so that one of the angle faces of the pin contacts one of the contact faces 66 or 68 of wedge 62. Thereafter, master jaw 4 is moved either inward or outward as described above. The movement of master jaw 4, as described above, tightens the new top jaw, base jaw 50 and jaw nut 12 in position above master jaw 4 exactly as described above.

The entire procedure for replacing one top jaw 18 with another can be rapidly and easily accomplished by the instant invention and does not require the precise alignment and manipulation of bolts through the top jaw into the jaw nuts as had previously been required. Additionally, no tools are needed in replacing and locking top jaw 18 to master jaw 4. Accordingly, the time required to change a top jaw has been greatly reduced from prior art devices.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim as new and desire to secure by Letters Patent of the United States is:

1. A top jaw system for securing a top jaw in position above a chuck comprising:
 a base jaw member having a lower portion and a wedge portion, said lower portion having a top surface and a bottom surface, said wedge portion integrally formed with and depending upward from the top surface of said lower portion, said wedge portion having an aperture defining a pair of flat angled contact faces and a bottom contact face, said pair of flat angled contact faces directed along radials extending outward from the center of the chuck, each of said angled contact faces forming an acute angle with the bottom contact face of said wedge portion;
 means for attaching said base jaw to the chuck;

a top jaw having a face disposed toward the chuck, said top jaw having a slot sized to receive said wedge portion of said base jaw, the slot extending from the face of said top jaw into said top jaw; and means for attaching said top jaw to said base jaw.

2. The top jaw system of claim 1, wherein said means for attaching said top jaw to said base jaw comprises:

an elongated pin having a pair of flat surfaces extending along said pin parallel to the elongated axis of said pin; and a pin aperture sized to receive said pin, the pin aperture extending through said top jaw and through the slot, the pin aperture extending through said top jaw at a right angle to said pair of angled contact faces when said wedge portion of said base jaw is positioned in the slot.

3. The top jaw system of claim 2, further including means for moving one of said pair of angled contact faces into contact with one of the pair of flat surfaces of said pin when said wedge portion is positioned in the slot and said pin is placed in said pin aperture;

whereby said top jaw is placed over said wedge portion of said base jaw so that said wedge portion extends into the slot and said pin is placed through said pin aperture, whereafter one of the pair of flat surfaces of said pin comes into contact with one of said pair of angled contact faces of said wedge portion when said means for moving said pair of angled contact faces moves one of said pair of contact faces into contact with one of the pair of flat surfaces of said pin thereby causing one of said pair of angled contact faces of said wedge portion to move upward over said pin thereby placing downward pressure on said pin and said top jaw and simultaneous upward pressure on said mean for attaching said base jaw to said chuck.

4. The top jaw system of claim 2, wherein said pin includes a pin head having a diameter larger than said pin aperture whereby said pin head contacts said top jaw thereby locating said pin in said pin aperture.

5. The top jaw system of claim 1, wherein said lower portion of said base jaw further having at least one aperture extending therethrough from the top surface of said lower portion to the bottom surface of said lower portion.

6. The top jaw system of claim 5, wherein said means for attaching said base jaw to the chuck comprises:

a master jaw placed in recesses in the chuck, said master jaw having a channel extending along its length;

a jaw nut shaped to correspond to the channel in said master jaw so that said jaw nut may be moved along the channel in said master jaw constrained in its movement by the boundaries of the channel, said jaw nut having a top surface and at least one aperture extending from the top surface of said jaw nut to a point within said jaw nut; and means for attaching said base jaw to said jaw nut.

7. The top jaw system of claim 6, wherein said means for attaching said base jaw to said jaw nut is at least one mounting bolt inserted through and retained within the aperture of said lower portion of said base jaw and the aperture of said jaw nut.

8. The top jaw system of claim 7, wherein said mounting bolt includes a bolt head having a diameter larger than the pin aperture of said lower portion at the bottom surface of said lower portion.

9. The top jaw system of claim 2: wherein said base jaw and said pin are hardened and titanium nitrate coated.

* * * * *